US010796567B1

(12) United States Patent
Tang et al.

(10) Patent No.: US 10,796,567 B1
(45) Date of Patent: Oct. 6, 2020

(54) VEHICLE IDENTIFICATION BASED ON MACHINE-READABLE OPTICAL MARKER

(71) Applicant: Capital One Services, LLC, McLean, VA (US)

(72) Inventors: Qiaochu Tang, The Colony, TX (US); Stephen Wylie, Carrollton, TX (US); Micah Price, Anna, TX (US); Jason Hoover, Grapevine, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 9 days.

(21) Appl. No.: 16/387,154

(22) Filed: Apr. 17, 2019

(51) Int. Cl.
*G08G 1/017* (2006.01)
*G06K 7/14* (2006.01)
*G06K 19/06* (2006.01)

(52) U.S. Cl.
CPC ........... *G08G 1/017* (2013.01); *G06K 7/1417* (2013.01); *G06K 19/0614* (2013.01); *G06K 19/06037* (2013.01)

(58) Field of Classification Search
CPC ................ G08G 1/017; G06K 7/1417; G06K 19/06037; G06K 19/0614
USPC ........................................................ 701/117
See application file for complete search history.

(56) References Cited

U.S. PATENT DOCUMENTS

| 7,407,106 | B2 | 8/2008 | Yee et al. |
| 8,291,610 | B2 | 10/2012 | Bergaglio |
| 9,686,646 | B1 * | 6/2017 | Pecard .................. H04W 4/021 |
| 10,037,689 | B2 * | 7/2018 | Taylor .................. G08G 1/0141 |
| 2007/0164117 | A1 | 7/2007 | Swiler et al. |
| 2014/0036076 | A1 * | 2/2014 | Nerayoff ................ H04N 7/181 348/148 |
| 2014/0098229 | A1 * | 4/2014 | Lu .......................... H04N 7/181 348/148 |

(Continued)

OTHER PUBLICATIONS

Moharil et al., "An Efficient Approach for Automatic Number Plate Recognition System Using Quick Response Codes", Bhupendra Moharil et al, / (IJCSIT) International Journal of Computer Science and Information Technologies, vol. 3 (5), 2012, pp. 5108-5115.

*Primary Examiner* — Khoi H Tran
*Assistant Examiner* — Rodney P King
(74) *Attorney, Agent, or Firm* — Harrity & Harrity, LLP

(57) ABSTRACT

Various aspects generally relate to identifying a vehicle based on a machine-readable optical marker. In some implementations, a server device may receive one or more images of an object and metadata related thereto. In some implementations, based upon the one or more images, an image processing engine may identify at least one non-visible spectrum marker on a surface of the object (e.g., a machine-readable optical marker that encodes information associated with the object). The server device may determine that the object depicted in the one or more images corresponds to a particular vehicle based on the information encoded by the machine-readable optical marker corresponding to an identifier associated with the particular vehicle. Accordingly, the server device may associate information identifying the particular vehicle with information identifying a location based on the metadata related to the one or more images to permit subsequent determination of the location of the particular vehicle.

20 Claims, 7 Drawing Sheets

(56) References Cited

U.S. PATENT DOCUMENTS

| | | |
|---|---|---|
| 2014/0261031 A1 | 9/2014 | Kellar et al. |
| 2014/0354400 A1* | 12/2014 | Seo ................... G07C 9/00111 340/5.7 |
| 2015/0103170 A1* | 4/2015 | Nelson .................. G06Q 40/08 348/148 |
| 2015/0248591 A1* | 9/2015 | Shi .......................... G06K 9/46 382/195 |
| 2017/0076127 A1 | 3/2017 | Arce et al. |
| 2018/0111554 A1* | 4/2018 | Pearce ............... G06K 9/00791 |
| 2018/0218606 A1* | 8/2018 | Michalakis .......... G05D 1/0234 |

* cited by examiner

VEHICLE IDENTIFICATION BASED ON MACHINE-READABLE OPTICAL MARKER

BACKGROUND

There are various existing approaches to associate a vehicle with one or more identifiers. For example, a vehicle identification number (VIN) is a unique code that is issued to identify a specific individual vehicle upon manufacture. In general, the VIN can be used to track recalls, vehicle registrations, compliance with importation regulations, warranty claims, thefts, collisions, insurance coverage, and/or the like. The VIN is typically permanently associated with an individual vehicle and made visible on one or more parts of the vehicle (e.g., on a tag or plate attached to the vehicle at a location where the dashboard meets the windshield on a driver's side, on a door post where the door latches when closed, etched onto the windshield and/or windows, and/or the like). In another example, a vehicle registration plate (also known as a license plate or a number plate) is a metal or plastic plate attached to a vehicle for official identification purposes. The vehicle registration plate typically includes a numeric or alphanumeric identifier that is unique within an issuing region (e.g., a state, province, country, and/or the like).

SUMMARY

According to some implementations, a method may include receiving, at a server device, information related to one or more images of an object; identifying, using an image processing engine associated with the server device, two or more markers depicted in the one or more images of the object, wherein the two or more markers are disposed over a surface of the object; comparing, using the image processing engine associated with the server, the two or more markers to determine a match of the two or more markers within a threshold; assigning, by the server device, an object identifier to the object depicted in the one or more images based on the match of the two or more markers; identifying, by the server device, a location of the object based on the information related to the one or more images of the object, wherein the location of the object is identified based on a location of a camera that captured the one or more images of the object in combination with an angle at which the camera was positioned relative to the object depicted in the one or more images; and associating, by the server device, one or more of the object or the object identifier with information identifying the location to permit the location of the object to be tracked.

According to some implementations, a server device may include a memory and one or more processors operatively coupled to the memory. The memory and the one or more processors may be configured to receive one or more images of an object and metadata related to the one or more images, wherein the metadata related to the one or more images includes one or more of a location of a camera that captured the one or more images of the object, an angle at which the camera was positioned relative to the object depicted in the one or more images, or a time when the camera captured the one or more images. The memory and the one or more processors may be further configured to identify, via an image processing engine and based upon the one or more images, at least one non-visible spectrum marker on a surface of the object, wherein the at least one non-visible spectrum marker is a machine-readable optical marker that encodes information associated with the object; determine that the object depicted in the one or more images corresponds to a particular vehicle based on the information encoded by the machine-readable optical marker corresponding to an identifier associated with the particular vehicle; and associate information identifying the particular vehicle with information identifying a location based on the metadata related to the one or more images to permit subsequent determination of the location of the particular vehicle.

According to some implementations, a non-transitory computer-readable medium may store one or more instructions. The one or more instructions, when executed by one or more processors of a device, may cause the one or more processors to receive information indicating that a camera having non-visible spectrum imaging capabilities captured one or more images depicting a plurality of machine-readable optical markers disposed over an exterior surface of a vehicle; determine that the plurality of machine-readable optical markers are associated with an encoded identifier associated with a group of vehicles; match the received information to the group of vehicles based on the encoded identifier; and transmit, to a client device, information indicating that the vehicle is a member of the group of vehicles based on matching the received information to the group of vehicles.

DETAILED DESCRIPTION

Figure 1A:
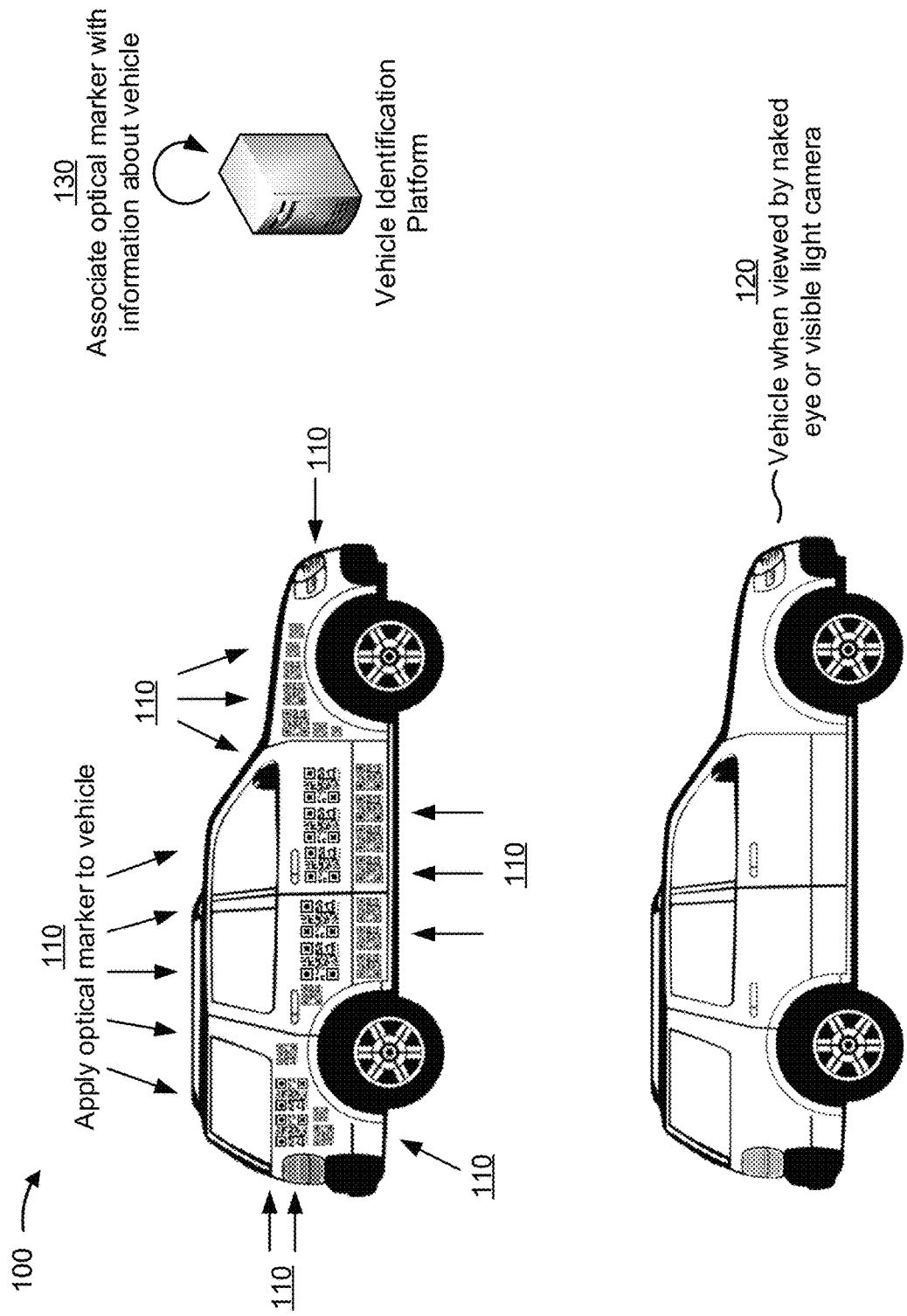
FIGS. 1A and 1B are diagrams of one or more example implementations described herein.

The following detailed description of example implementations refers to the accompanying drawings. The same reference numbers in different drawings may identify the same or similar elements.

The growth of vehicle populations along with substantial amounts of vehicle data has created a demand for automated, secure, and reliable autonomous identification techniques that can be used with moving and/or stationary objects such as vehicles. In general, automatic vehicle identification (AVI) systems depend on the availability of a mechanism to convey and read one or more identifiers associated with a vehicle. For example, existing AVI systems typically use some combination of wireless beacons, drones, sensors, radio-frequency identification (RFID), and computer vision based on automatic number plate recognition (ANPR). However, these approaches all suffer from various drawbacks and limitations.

For example, existing solutions that are based on wireless beacons typically use low-powered transmitters (e.g., Bluetooth transmitters) that are attached to a vehicle. In order to identify the vehicle, an appropriate receiver device may need to come within range of the vehicle and determine one or more identifiers that are conveyed in the wireless beacon. Furthermore, in systems that are designed to track vehicle locations (e.g., at a car dealership), a person (e.g., a sales associate, a lot manager, and/or the like) may need to walk through an area where vehicles are parked while carrying a receiver device that is connected to a positioning system in order to record an approximate location for each vehicle. This process tends to be time-consuming and costly because devices used to transmit the wireless beacons while vehicles are parked are often battery-powered and need to be replaced from time to time. Moreover, in order to suitably identify the vehicle associated with a given wireless beacon, there needs to be a setup process whereby the wireless beacon is registered or otherwise associated with an identifier assigned to the vehicle (e.g., a vehicle identification number (VIN)). While this setup process may allow detection of the wireless beacon to operate as a proxy for detection of the associated vehicle, this approach tends to be imprecise because the wireless beacon can only convey an approximate vehicle location up to an accuracy of about 10 meters due to refraction and distortion of the low-powered wireless signal that carries the wireless beacon. The refraction, distortion, and/or other signal characteristics of the wireless beacon causes difficulty when attempting to read wireless beacons transmitted by moving vehicles.

Furthermore, existing vehicle identification techniques that use drones or other unmanned aerial vehicles typically use a flying drone to come within sufficient proximity of a vehicle to detect a wireless beacon, determine one or more identifiers conveyed in the wireless beacon, and record an approximate location of the vehicle. Accordingly, drones tend to face substantially the same limitations as wireless beacons. Additionally, drones may present further challenges with respect to moving vehicles, as the need to come within a few meters of the wireless transmitter could cause safety hazards (e.g., distracting the driver of the vehicle and/or nearby vehicles, potentially colliding with the vehicle and/or nearby vehicles, and/or the like). While sensor-based solutions may use motion sensors and/or the like to detect when a vehicle has been moved, this method alone cannot determine the identity of a vehicle.

Accordingly, based on the above limitations of identification solutions that rely upon wireless beacons and/or sensors, existing AVI systems tend to use data collection methods based on RFID from dedicated short-range communication transponders and/or ANPR based on vehicle registration plates depicted in images collected by cameras that are mounted on vehicles and/or fixtures in a location where vehicle identification functions are to be performed. However, RFID solutions tend to use expensive scanners and RFID chips to record time and/or location data associated with a vehicle, which introduces a high setup cost because an RFID scanner has to be installed at each location where vehicles are to be identified and each vehicle to be identified has to be equipped with an RFID chip to be read. Furthermore, like wireless beacons, RFID solutions have a limited range.

Approaches using computer vision based on ANPR generally use optical character recognition to read a vehicle identifier from one or more images that are captured using closed-circuit television cameras, road-rule enforcement cameras, and/or other suitable cameras that are configured and deployed to determine vehicle identities. However, systems that employ computer vision based on ANPR also face various challenges, including poor file resolution (e.g., because the plate is too far away), blurry images due to motion blur, poor lighting and/or low contrast due to overexposure, reflection, or shadows, one or more objects obscuring or obstructing all or part of the plate, different license plates at the front and back of a vehicle (e.g., because of towed trailers, campers, and/or the like), a vehicle changing lanes in a camera's view angle during license plate reading, variations in fonts from one issuing jurisdiction to another, circumvention techniques such as placing tinted covers over the registration plate to prevent electronic scanning, lack of coordination between issuing jurisdictions that can lead to vehicles from different states or countries having the same number, and/or the like. Moreover, the license plate is typically attached to the vehicle at a limited number of locations (e.g., front and rear, or rear-only), which may limit the ability of a camera to capture a suitable image from which to recognize the characters on the license plate.

Some implementations described herein may utilize computer vision techniques to determine an identity of a vehicle based on one or images that depict one or more machine-readable optical markers disposed on a surface of the vehicle. For example, the one or more machine-readable optical markers may comprise matrix codes (sometimes referred to as a two-dimensional barcode, a matrix barcode, and/or the like) that includes various black and white cells or modules arranged in a particular pattern (e.g., a square pattern, a rectangular pattern, and/or the like). In some implementations, the machine-readable optical markers may encode any suitable identifier associated with the vehicle (e.g., a VIN, a license plate number, a universally unique identifier (UUID) or globally unique identifier (GUID) assigned to the vehicle, a group identifier associated with a group of vehicles such as a vehicle fleet in which the vehicle is a member, and/or the like). The machine-readable optical markers may be applied to a single location on the surface of the vehicle or at multiple locations on the surface of the vehicle (e.g., on a roof, hood, doors, trunk, and/or the like). The machine-readable optical markers may be of varying shapes and or sizes and various implementations may include any combination of machine-readable optical markers applied at various locations and being of varying sizes, shapes, etc. For example, in some implementations, a single relatively large machine-readable optical marker may be applied to a roof or a hood of a vehicle. In another example, multiple (relatively smaller) machine-readable optical markers may be applied to several surface locations of the vehicle in addition to or exclusive of a single relatively large machine-readable optical marker applied elsewhere on the vehicle. Additionally, or alternatively, one or more of the machine-readable optical markers may be subjected to a homographic transformation (e.g., simulating a different perspective) prior to application to the vehicle, which may reduce distortion of the machine-readable optical marker(s) when viewed from certain angles.

In this way, the machine-readable optical markers may be detectable from multiple different angles, including angles from which the license plate may not be visible, angles from which the machine-readable optical marker(s) may be distorted or unreadable, and/or the like. In this way, because the machine-readable optical markers are detectable from multiple locations, the identifier(s) encoded by the machine-readable optical markers may be read even if one or more of the machine-readable optical markers are scratched, damaged, obscured, or otherwise unreadable. Furthermore, in some implementations, the machine-readable optical markers used to encode the identifier(s) associated with the vehicle may be provided with error correction capabilities (e.g., by adding a Reed-Solomon code). In this way, the identifier(s) encoded by a particular machine-readable optical marker may be read even if a portion of the machine-readable optical marker is dirty, damaged, obscured, and/or the like.

Figure 1B:
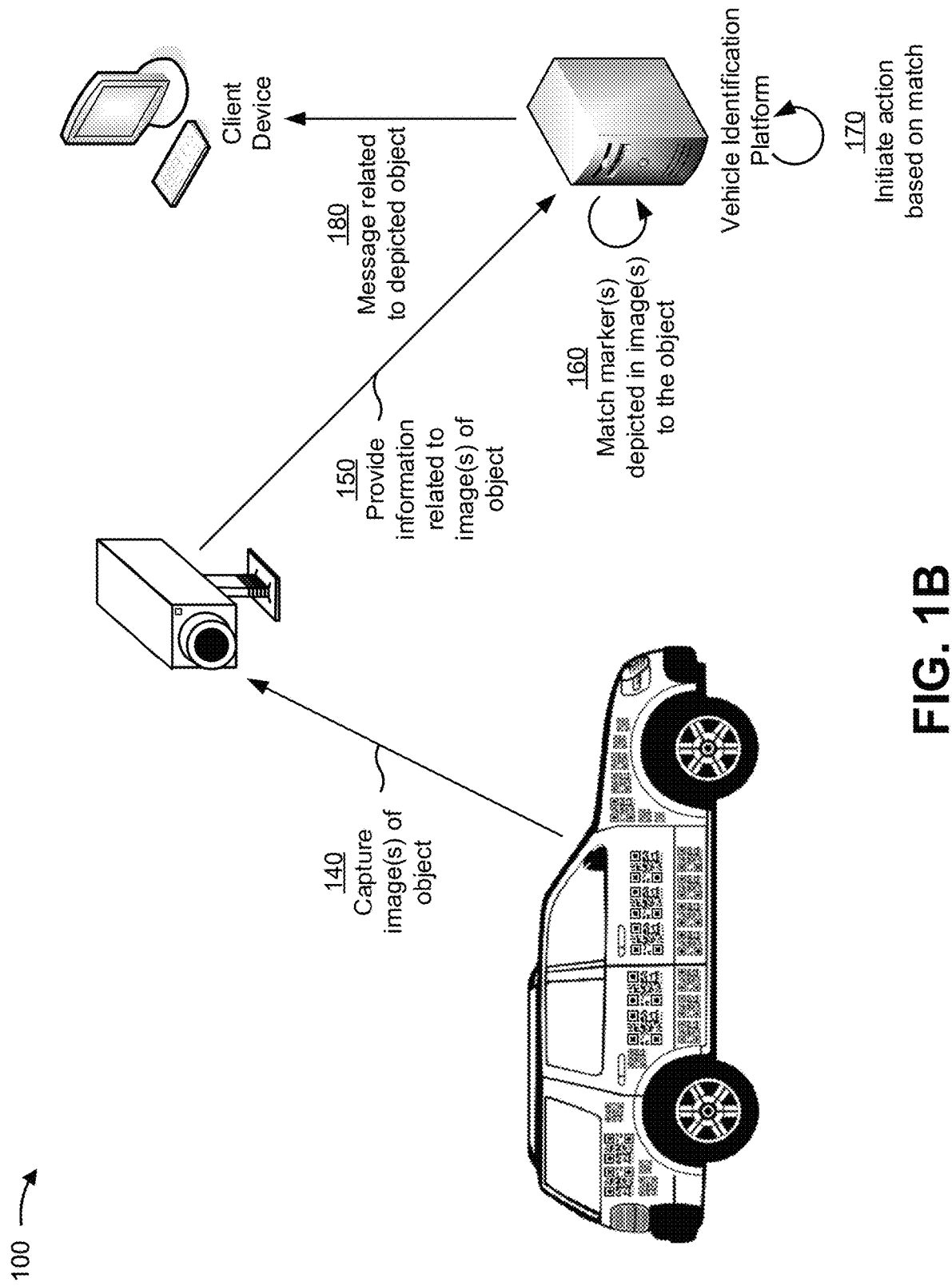

FIGS. 1A and 1B are diagrams of one or more example implementations 100 described herein. In the following description, implementation(s) 100 may be described in a context that relates to identifying one or more vehicles based on one or more images that depict one or more machine-readable optical markers disposed on a surface of the vehicle(s). However, it will be appreciated that this description is for illustration purposes only, and that the techniques described herein may be used to identify any suitable object having the one or more machine-readable optical markers disposed on a surface thereof.

As shown in FIG. 1A, and by reference number 110, a machine-readable optical marker may be applied to a vehicle. For example, the machine-readable optical marker may be painted on the vehicle, printed on one or more decals that are applied to the vehicle, printed as a graphic on a wrap that can be applied to the vehicle, and/or the like. As mentioned above, the machine-readable optical marker may be a two-dimensional matrix code (e.g., a Quick Response (QR) code, a Data Matrix code, an Aztec code, and/or the like) that can encode alphanumeric data. Accordingly, in some implementations, the machine-readable optical marker may encode a suitable identifier associated with the vehicle to which the machine-readable optical marker is applied. For example, the identifier may be a VIN that is assigned to the vehicle upon manufacture, a license plate number assigned to the vehicle, a UUID or GUID assigned to the vehicle (e.g., by a vehicle identification platform), a group identifier assigned to a group of vehicles that includes the vehicle, and/or the like.

In some implementations, the machine-readable optical marker may be applied to the vehicle multiple times, whereby multiple repeated instances of the machine-readable optical marker may form a pattern on a surface of the vehicle. For example, as shown in FIG. 1A, the machine-readable optical marker may be applied on a roof of the vehicle, on a hood of the vehicle, on one or more doors of the vehicle, on a trunk or rear door of the vehicle, on one or more bottom surfaces of the vehicle, and/or the like. Furthermore, in some implementations, one or more instances of the machine-readable optical marker may have dimensions that are sufficiently large to enable detection by an overhead camera, a camera that may be located distant from the vehicle (e.g., by a camera-equipped drone, helicopter, and/or the like at an altitude where there may be little or no risk of collision with the vehicle and/or nearby objects), a camera that is located on the ground and/or at ground level, and/or the like.

Additionally, or alternatively, one or more instances of the machine-readable optical marker may be subjected to a homographic transformation that essentially simulates a different perspective prior to application to the vehicle, which may reduce distortion of the one or more instances of the machine-readable optical marker when viewed from certain angles. For example, when the one or more instances of the machine-readable optical marker have a square, rectangular, or similar shape, the homographic transformation may result in the one or more instances of the machine-readable optical marker appearing like a trapezoid or other similar shape with stretched corners when viewed from straight on (e.g., orthogonally). However, when viewed by a camera or other imaging device from a given angle (e.g., parallel or close to parallel), the one or more instances of the machine-readable optical marker that are subjected to the homographic transformation may appear less distorted. Accordingly, when the camera or other imaging device captures one or more images in which one or more instances of the machine-readable optical marker have been subjected to the homographic transformation, such instances of the machine-readable optical marker may be read by solving an inverse of the homographic transformation (e.g., based on an angle at which the camera was positioned when the one or more images were captured).

In this way, by applying multiple instances of the machine-readable optical marker to the vehicle, the machine-readable optical marker may be visible from multiple different angles, including angles from which the license plate may be unreadable. In this way, if one or more of the machine-readable optical markers are damaged, dirty, partially or fully obscured, and/or otherwise unreadable, applying multiple instances of the machine-readable optical marker to the vehicle may substantially increase the chances that a camera will be able to capture an image of sufficient quality for at least one of the machine-readable optical markers regardless of the angle of the camera with respect to the vehicle. For example, in some implementations, multiple partial images of the machine-readable optical marker may be stitched together to produce one or more images that depict a complete instance of the machine-readable optical marker that can be read in substantially the same way as an original image that depicts a complete instance of the machine-readable optical marker. Furthermore, in some implementations, an analysis of the multiple instances of the machine-readable optical marker may be used to detect damage to the vehicle (e.g., based on determining that the pattern in which the multiple instances of the machine-readable optical marker are formed has been perturbed).

In some implementations, as noted above, the machine-readable optical marker may be configured with one or more error correction codes (e.g., Reed-Solomon codes, convolution-based error correction codes, and/or the like) that can increase reliability by allowing the identifier(s) encoded by the machine-readable optical marker to be read even if one or more cells are damaged, dirty, and/or otherwise unreadable. Additionally, or alternatively, the machine-readable optical marker may encode a cyclic redundancy check (CRC) to enable error detection at the time that the machine-readable optical marker is read. In this way, the error correction and/or error detection codes may increase detectability and/or accuracy relative to approaches that use optical character recognition and/or other visual markers that do not have built-in fault tolerance mechanisms. Furthermore, detecting one or more cells that are damaged, dirty, and/or otherwise unreadable may indicate damage to the vehicle (e.g., scratches, dents, and/or the like).

In some implementations, the machine-readable optical marker may have a design that enables fast readability. For example, the machine-readable optical marker may include various colored modules (e.g., black dots) that are arranged in a particular pattern against a contrasting (e.g., white) background. The machine-readable optical marker may further include one or more distinctive elements that allow contents of the machine-readable optical marker to be decoded at a high speed (e.g., for a QR code, the distinctive elements may include three squares that are positioned at three corners of the image and a smaller square positioned at a fourth corner of the image). Accordingly, a device reading the machine-readable optical marker may normalize a size, orientation, and viewing angle for the image based on locations of the distinctive elements and then read the data encoded by the machine-readable optical marker. In this way, the machine-readable optical marker may offer faster read performance, shorter response time, and/or the like relative to approaches based on optical character recognition (e.g., automatic number plate recognition). Furthermore, the machine-readable optical marker may be read from any direction or orientation, and angular detection may be possible even if part of the machine-readable optical marker is damaged, dirty, blurry, or otherwise unreadable.

As further shown in FIG. 1A, and by reference 120, the machine-readable optical marker may be formed from a non-visible spectrum material (e.g., paint, ink, and/or the like) that is invisible or semi-invisible to a human eye and to cameras that only have visible light imaging capabilities. For example, the non-visible spectrum material may be an infrared coating, an ultraviolet coating, a light-reflective coating, and/or the like. In particular, the human eye can generally see light in a range from about 400 nanometers (violet) to about 700 nanometers (red) but cannot see below 400 nanometers (ultraviolet) or above 700 nanometers (infrared). In this way, by using paint, ink, and/or other material(s) that do not fluoresce in the visible range from 400-700 nanometers and instead fluoresce only under ultraviolet and/or infrared lighting, the machine-readable optical markers may be visible only to specialized cameras, sensors, and/or other equipment having appropriate non-visible spectrum imaging capabilities. In this way, a camera having the appropriate non-visible spectrum imaging capabilities may detect the machine-readable optical marker at any time of day or night. Furthermore, in this way, certain circumvention techniques that are employed to interfere with automatic number plate recognition systems (e.g., increasing the reflective properties of license plate lettering) may not affect detectability of the machine-readable optical marker. Furthermore, in some implementations, the non-visible spectrum material may have one or more taggants that can emit coded optical signals outside the visible spectrum and limit detectability to equipment that has been specifically configured to detect the taggants. In this way, using the non-visible spectrum material may provide a security mechanism to help protect against counterfeiting, fraud, theft, tampering, and/or other nefarious activity.

As further shown in FIG. 1A, and by reference number 130, a vehicle identification platform may associate the machine-readable optical marker with information about the vehicle. For example, in some implementations, the vehicle identification platform may use the identifier(s) encoded by the machine-readable optical marker applied to the vehicle to index information about the vehicle (e.g., a VIN, a license plate number, information associated with a registered owner or other user of the vehicle, which may include a name, driver's license number, insurance information, and/or the like, descriptive information such as a make, model, color, year, engine size, fuel type, mileage, and/or the like). Furthermore, in some implementations, the vehicle identification platform may associate the identifier(s) encoded by the machine-readable optical marker with one or more records that correspond to scan events in which the machine-readable optical marker applied to the vehicle is detected. For example, the one or more records may include a location, a time, and/or other suitable information associated with the scan events, as will be described in further detail below. In some implementations, the vehicle identification platform may further store one or more images that correspond to the machine-readable optical marker applied to the vehicle. Accordingly, an image processing engine may compare the stored image and a machine-readable optical marker depicted in one or more images captured via a camera device to determine whether the stored image and the machine-readable optical marker depicted in the captured image(s) match within a threshold.

As shown in FIG. 1B, and by reference number 140, a fixed and/or mobile camera may capture one or more images of an object (e.g., a vehicle) having a machine-readable optical marker disposed on a surface thereof when the object is in a field of view of the camera. For example, the camera may be deployed or otherwise associated with a vehicle dealership, a parking facility, an electronic toll collection site, a traffic control device, a traffic monitoring device, a traffic analysis device, a private enterprise, a private residence, and/or any other suitable location where determining an identity associated with a vehicle may be desired. Furthermore, in some implementations, the camera may be a camera device that is dedicated to or otherwise designed for vehicle identification (e.g., a closed-circuit television device, a road-rule enforcement camera, a perimeter security camera, and/or the like). Additionally, or alternatively, the camera may be part of another device that has suitable image capturing capabilities (e.g., a smartphone, a scanning device used by law enforcement, a flying drone or helicopter, and/or the like). In some implementations, the one or more images captured by the camera may be still images, individual video frames, and/or the like. In some implementations, the camera may have non-visible spectrum imaging capabilities to enable detection of the machine-readable optical marker, which may be formed from a non-visible spectrum material, as mentioned above.

As further shown in FIG. 1B, and by reference number 150, the camera may provide information related to the one or more images to a vehicle identification platform. For example, in some implementations, the camera may include or be coupled to a device that has sufficient local processing capabilities to read the machine-readable optical marker(s) depicted in the one or more images and thereby determine the identifier(s) and/or other information encoded by the machine-readable optical marker(s). Additionally, or alternatively, the camera may provide the one or more images to the vehicle identification platform, which may read the machine-readable optical marker(s) depicted in the one or more images to determine the identifier(s) and/or other information encoded by the machine-readable optical marker(s). Furthermore, in some implementations, the information provided to the vehicle identification platform may include metadata related to the one or more images, which may include a timestamp (including a date) associated with the one or more images and information for determining a location of the vehicle depicted in the one or more images. For example, the information for determining a location of the vehicle may include coordinates associated with the camera that captured the one or more images, an identifier associated with the camera that captured the one or more images, an angle at which the camera was positioned when the one or more images were captured, and/or the like. In this way, the vehicle identification platform may associate the vehicle and/or the identifier(s) encoded by the machine-readable optical marker with a particular location, a particular time, and/or other suitable metadata to enable one or more vehicle identification and/or vehicle tracking use cases, some of which are described in further detail below.

As further shown in FIG. 1B, and by reference number 160, the vehicle identification platform may match the machine-readable optical marker(s) depicted in the one or more images to the corresponding object (e.g., vehicle) on which the machine-readable optical marker(s) are disposed. For example, in the case where the camera decodes or otherwise reads the identifier(s) encoded by the machine-readable optical marker(s), the vehicle identification platform may perform a lookup process based on the identifier(s) to retrieve information about the corresponding vehicle (e.g., VIN, license plate number, driver information, a vehicle description, and/or the like). Additionally, or alternatively, in the case where the camera provides raw images, video, and/or the like, the vehicle identification platform may locate the machine-readable optical marker(s) within the one or more images and read the identifier(s) encoded thereby, which can be matched to an identifier associated with one or more vehicles.

Additionally, or alternatively, the vehicle identification platform may perform one or more secondary comparisons to validate that the machine-readable optical marker(s) were correctly decoded. For example, the vehicle identification platform may use an image processing engine (e.g., a local image processing engine, an image processing engine associated with the camera, a remote image processing engine, and/or the like) to identify one or more features associated with the vehicle having the machine-readable optical marker(s) disposed on the surface thereof. For example, the one or more features may comprise a color of the vehicle, a make and model of the vehicle, and/or other suitable visual characteristics of the vehicle. Accordingly, based on identifying a vehicle associated with the identifier(s) encoded by the machine-readable optical marker, the vehicle identification platform may retrieve information about the identified vehicle to verify the match (e.g., verifying that the vehicle depicted in the image(s) matches the make, model, color and/or the like of the corresponding record).

In another example, if the license plate of the vehicle is visible in the one or more images, the vehicle identification platform may perform an optical character recognition process to identify the license plate number and determine whether the license plate number matches the information contained in the record associated with the vehicle within a threshold. For example, the license plate number may be determined to match within the threshold if the optical character recognition process yields a license plate number that exactly matches the license plate number contained in the record associated with the vehicle. Additionally, or alternatively, the threshold may take into account certain imperfections in the optical character recognition process (e.g., where a capital letter 'T' read from an angle can be mistakenly read as a capital 'I'). Accordingly, the license plate number may be determined to match within the threshold if the optical character recognition process yields a license plate number that substantially matches the license plate number contained in the record associated with the vehicle and mismatches only with respect to certain numbers or characters that are often associated with misidentification when read from a poor angle, in poor weather conditions, poor quality images, ambiguous or non-standard fonts, and/or the like.

As further shown in FIG. 1B, and by reference number 170, the vehicle identification platform may initiate one or more actions based on the match between the information encoded by the machine-readable optical marker(s) depicted in the one or more images and the corresponding object (e.g., vehicle). More particularly, the one or more actions may include associating the vehicle with information identifying a particular location where the vehicle was observed and a particular time when the vehicle was observed at that location. For example, the location of the vehicle may be identified based on a location of the camera that captured the one or more images, which may be known based on location information provided by the camera or a location mapped to an identifier associated with the camera. Furthermore, in some implementations, the location may depend on an angle at which the camera was positioned relative to the vehicle when the one or more images were captured, a size of the vehicle within the one or more images, and/or other suitable information that may indicate a position of the vehicle relative to a position of the camera (e.g., based on an angle, a distance, and/or the like between the camera and the vehicle). Additionally, as noted above, the information provided by the camera may include a timestamp associated with the one or more images, which may indicate the date and time when the vehicle was observed at the identified location.

In some implementations, in addition to storing information related to the location where the vehicle was observed by the camera and/or the time when the vehicle was observed by the camera, the one or more actions initiated by the vehicle identification platform may include determining that the machine-readable optical marker(s) applied to the vehicle encode or are otherwise associated with one or more identifiers that correspond to a group of vehicles. For example, the group of vehicles may be a vehicle fleet, an inventory of vehicles, a military division, and/or the like. Accordingly, based on the match between the machine-readable optical marker(s) applied to the vehicle and the one or more identifiers that correspond to the group of vehicles, the vehicle identification platform may determine that the vehicle is a member of the group of vehicles. In this way, the vehicle identification platform may determine whether the vehicle is authorized to be in the location where the vehicle was observed and/or whether the vehicle is authorized to be in that location at the time when the vehicle was observed.

As further shown in FIG. 1B, and by reference number 180, the action initiated by the vehicle identification platform based on the match between the machine-readable optical marker(s) depicted in the one or more images and the identifier associated with the vehicle may additionally, or alternatively, include transmitting a message related to the object depicted in the one or more images to a client device. For example, the client device may request information about a specific vehicle (e.g., a location associated with a specific vehicle), and the message transmitted to the client device may indicate when and/or where the vehicle was last observed. In another example, the client device may be associated with a paid parking facility, an electronic toll collection system, and/or the like, whereby the message transmitted to the client device may indicate that an appropriate transaction was processed (e.g., billing an account associated with the vehicle) and/or include information to enable the client device to process the transaction. In still another example, the message transmitted to the client device may include information associated with the registered user of the vehicle, descriptive information associated with the vehicle, and/or the like. In this way, the message transmitted to the client device may be used for law enforcement purposes (e.g., locating a vehicle of interest), automatically exchanging insurance information after a collision (e.g., drivers may use their smartphones to scan the machine-readable optical markers applied to each other's vehicles and the vehicle identification platform may return the other driver's license and insurance information), and/or the like.

Accordingly, based on the foregoing, it will be apparent that the machine-readable optical barcode can be used to enable any suitable use case that may depend on the identity of a vehicle, a driver of a vehicle, and/or the like. For example, as noted above, the applicable use cases may include identifying and/or locating vehicles of interest (e.g., stolen vehicles, vehicles with unpaid fines, vehicles involved in missing persons reports, and/or the like), to determine whether a vehicle is permitted in a restricted area and/or notify an appropriate entity (e.g., via the client device) as to whether a given vehicle is authorized to be in the restricted area, and to enforce road rules such as lane restrictions, speed limits, and/or the like (e.g., reporting vehicles that improperly drive in a bus lane or carpool lane, detecting speed limit violations based on a distance between two cameras and an amount of time between a scan event at a first camera and a second camera, and/or the like). In still other examples, the camera may be located at a parking facility such that a user of client device can query the vehicle identification platform to retrieve information indicating where the user parked his/her vehicle. A further example use case may be for identifying a vehicle associated with a pickup service (e.g., curbside pickup at a restaurant or other establishment), which may include sending a notification to the client device indicating that the vehicle is ready to pick up one or more items when a camera at the establishment detects the machine-readable optical marker associated with the vehicle. Various other exemplary use cases may include security and access control at private and/or public perimeters, enforcing geofences, parking (e.g., valet) services, traffic monitoring and/or control, electronic toll collection, locating vehicles to be repossessed, tracking movements of surveillance targets, targeted advertising, and/or the like.

As indicated above, FIGS. 1A and 1B are provided as one or more examples. Other examples may differ from what is described with regard to FIGS. 1A and 1B.

Figure 2:
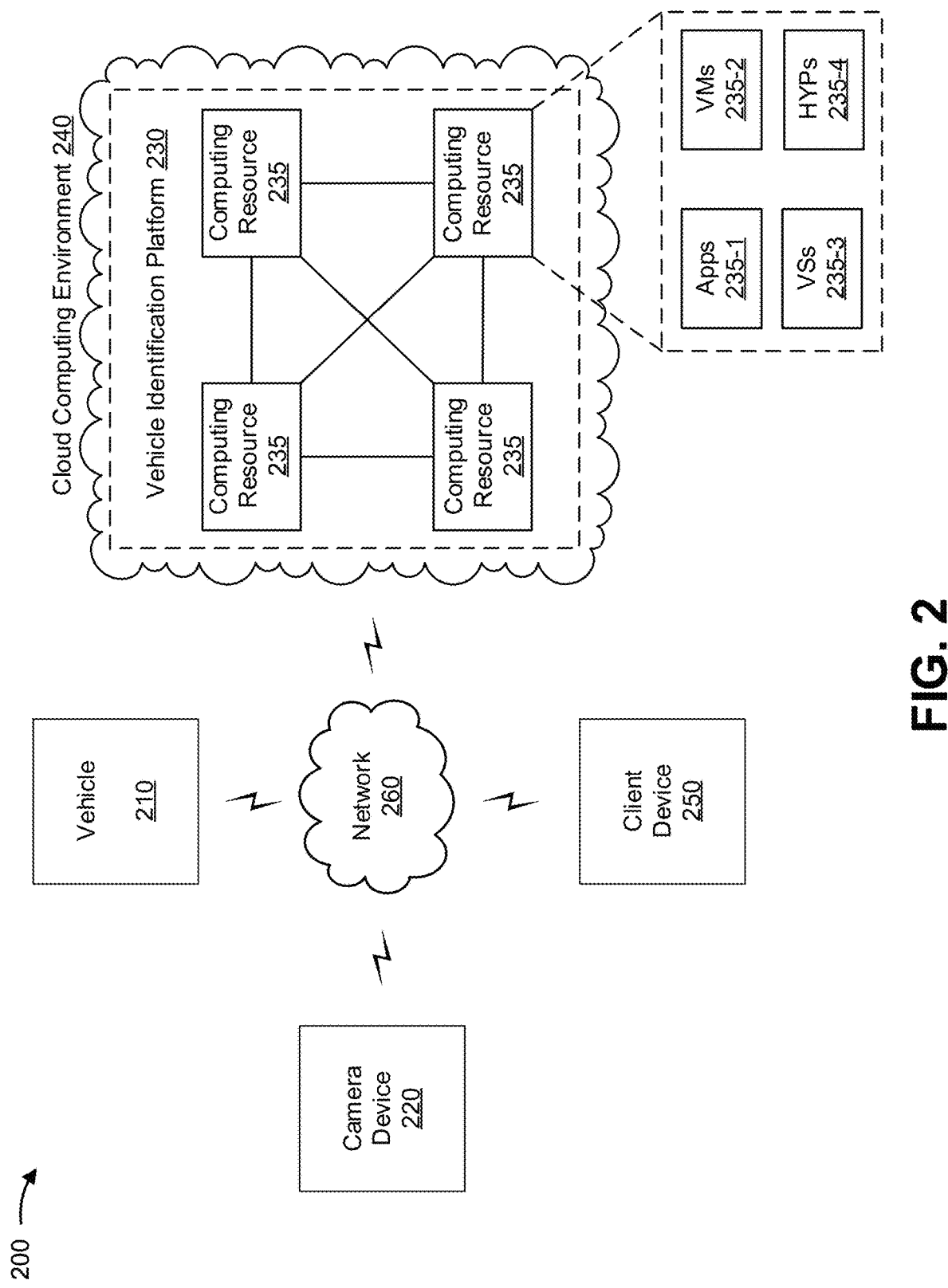
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a vehicle 210, a camera device 220, a vehicle identification platform 230, a computing resource 235, a cloud computing environment 240, a client device 250, and a network 260. Devices of environment 200 may interconnect via wired connections, wireless connections, or a combination of wired and wireless connections.

Vehicle 210 includes one or more machines and/or other suitable objects to be identified. For example, in some implementations, vehicle 210 may be a car, a truck, a motorcycle, a bus, a boat, an airplane, a helicopter, an unmanned aerial vehicle, farm equipment (e.g., a tractor, a plow, and/or the like), construction equipment (e.g., a bulldozer, an excavator, and/or the like), a spacecraft, and/or the like. In some implementations, vehicle 210 may have one or more machine-readable optical markers disposed on a surface thereof to encode one or more identifiers associated with vehicle 210 and thereby enable identification, tracking, authentication, and/or other suitable operations that depend, at least in part, on an identity or a group identity associated with vehicle 210. In some implementations, the one or more machine-readable optical markers may be formed from a non-visible spectrum material (e.g., an infrared coating, an ultraviolet coating, a light-reflective coating, and/or the like). In some implementations, vehicle 210 includes one or more communication devices enabling vehicle 210 to communicate with camera device 220, vehicle identification platform 230, client device 250, and/or other suitable devices via network 260.

Camera device 220 includes one or more devices capable of receiving, generating, storing, processing, and/or providing information associated with one or more images (e.g., still photographs, video frames, and/or the like). For example, camera device 220 may include a digital still camera, an analog still camera, a digital video camera, an analog video camera, and/or a communication and/or computing device in communication with a camera, such as a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), a server device, a group of server devices, a cloud computing device, a data center device, or a similar type of device. Camera device 220 may include hardware, or a combination of hardware and software, that enables camera device 220 to capture an image and/or video and transmit the captured image and/or video to another device or devices, such as vehicle identification platform 230 and/or client device 250. In some implementations, camera device 220 may be fixed to a particular location (e.g., at a place of business such as a vehicle dealership, at a parking facility, a roadside location, a toll collection site, and/or the like), and in some implementations, camera device 220 may be included in another device, such as vehicle identification platform 230 and/or client device 250. In some implementations, the data captured by camera device 220 may include other data enabling identification of objects, such as matrix bar code capture data, bar code reader data, optical character recognition capture data, and/or the like (e.g., enabling camera device 220 to be capable of scanning a machine-readable optical marker for identifying an object such as vehicle 210). In some implementations, camera device 220 may have non-visible spectrum imaging capabilities to enable detection of a machine-readable optical marker formed from a non-visible spectrum material and disposed over a surface of an object such as vehicle 210.

Vehicle identification platform 230 includes one or more computing resources assigned to identify an object (e.g., vehicle 210) based on one or more machine-readable optical markers that are disposed over a surface of the object. For example, vehicle identification platform 230 may be a platform implemented by cloud computing environment 240 that may identify, using an image processing engine, one or more markers depicted in one or more images of an object, assign an object identifier to the object depicted in the one or more images based on the one or more markers matching a marker associated with the object identifier within a threshold, and associate the object and/or the object identifier with information identifying a location, a time, and/or other suitable information to be tracked with respect to the object. In some implementations, vehicle identification platform 230 is implemented by computing resources 235 of cloud computing environment 240.

Vehicle identification platform 230 may include a server device or a group of server devices. In some implementations, vehicle identification platform 230 may be hosted in cloud computing environment 240. Notably, while implementations described herein describe vehicle identification platform 230 as being hosted in cloud computing environment 240, in some implementations, vehicle identification platform 230 may be non-cloud-based or may be partially cloud-based.

Cloud computing environment 240 includes an environment that delivers computing as a service, whereby shared resources, services, etc. may be provided to camera device 220 and/or client device 250. Cloud computing environment 240 may provide computation, software, data access, storage, and/or other services that do not require end-user knowledge of a physical location and configuration of a system and/or a device that delivers the services. As shown, cloud computing environment 240 may include vehicle identification platform 230 and computing resource 235.

Computing resource 235 includes one or more personal computers, workstation computers, server devices, or another type of computation and/or communication device. In some implementations, computing resource 235 may host vehicle identification platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by client device 250. Application 235-1 may eliminate a need to install and execute the software applications on client device 250. For example, application 235-1 may include software associated with vehicle identification platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., client device 250), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Client device 250 includes one or more devices capable of receiving, generating, storing, processing, and/or providing information associated with one or more objects that are identified based on one or more images depicting one or more machine-readable optical markers disposed over a surface of the one or more objects. For example, client device 250 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
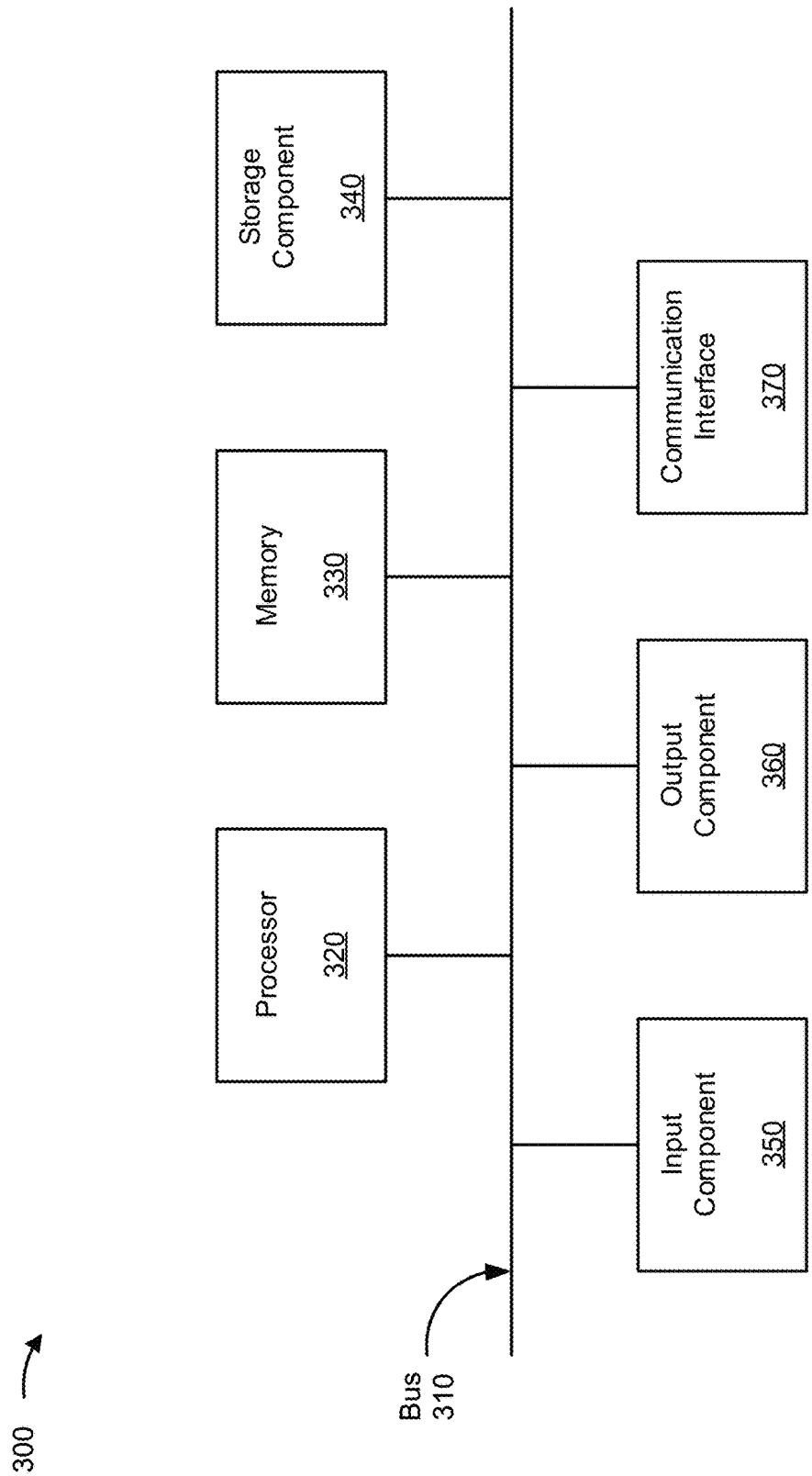
FIG. 3 is a diagram of example components of one or more devices of FIG. 2.

FIG. 3 is a diagram of example components of a device 300. Device 300 may correspond to camera device 220, vehicle identification platform 230, computing resource 235, and/or client device 250. In some implementations, camera device 220, vehicle identification platform 230, computing resource 235, and/or client device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
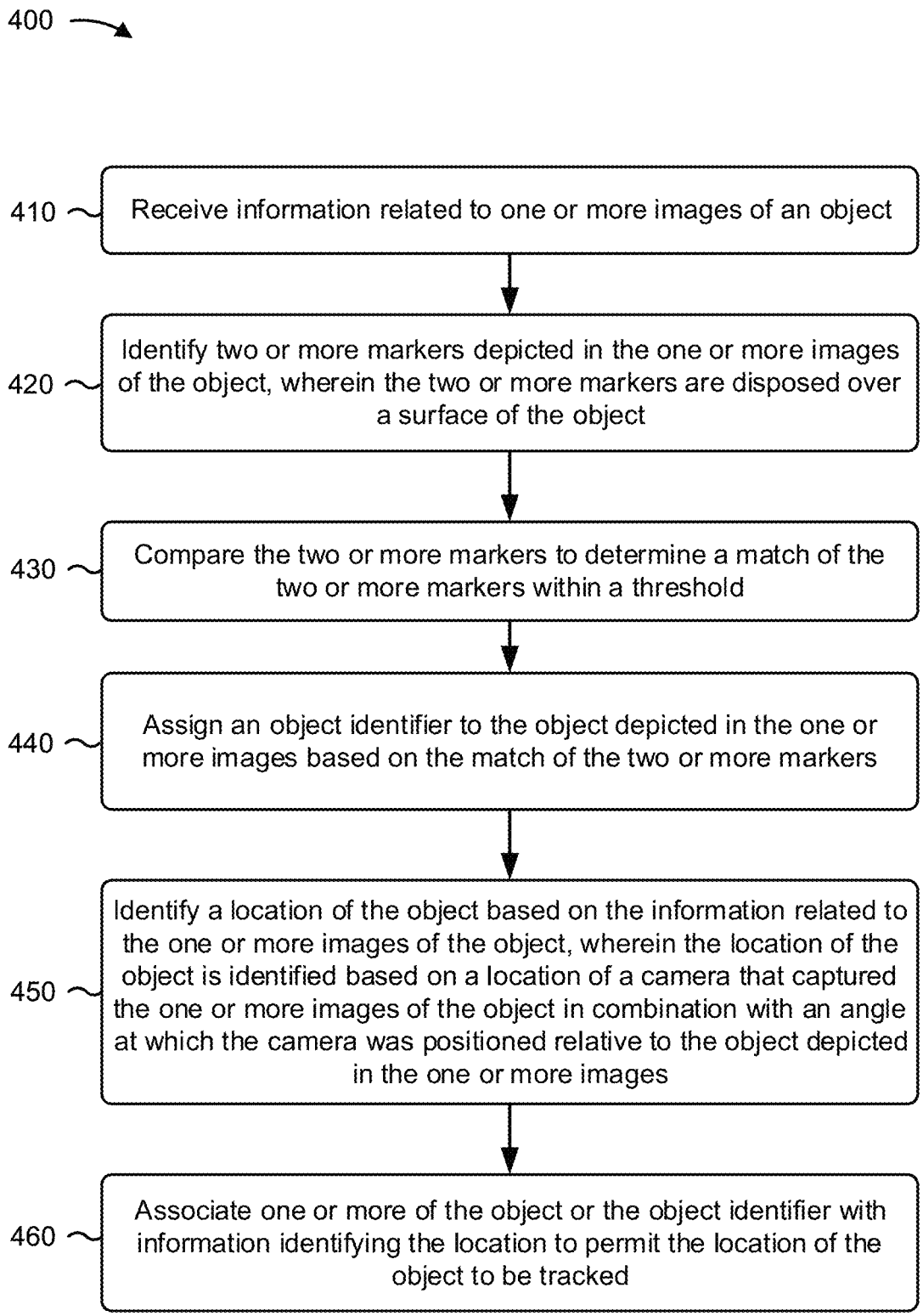
FIGS. 4-6 are flow charts of example processes for vehicle identification based on a machine-readable optical marker.

FIG. 4 is a flow chart of an example process 400 for vehicle identification based on a machine-readable optical marker. In some implementations, one or more process blocks of FIG. 4 may be performed by server device (e.g., vehicle identification platform 230). In some implementations, one or more process blocks of FIG. 4 may be performed by another device or a group of devices separate from or including the server device, such as a camera device (e.g., camera device 220), a client device (e.g., client device 250), and/or the like.

As shown in FIG. 4, process 400 may include receiving information related to one or more images of an object (block 410). For example, the server device (e.g., using processor 320, memory 330, storage component 340, input component 350, output component 360, communication interface 370 and/or the like) may receive information related to one or more images of an object, as described above.

As further shown in FIG. 4, process 400 may include identifying two or more markers depicted in the one or more images of the object wherein the two or more markers are disposed over a surface of the object (block 420). For example, the server device (e.g., using processor 320, memory 330, storage component 340, input component 350, output component 360, communication interface 370 and/or the like) may identify, using an image processing engine, two or more markers depicted in the one or more images of the object, as described above. In some implementations, the two or more markers are disposed over a surface of the object.

As further shown in FIG. 4, process 400 may include comparing the two or more markers to determine a match of the two or more markers within a threshold (block 430). For example, the server device (e.g., using processor 320, memory 330, storage component 340, input component 350, output component 360, communication interface 370 and/or the like) may compare, using the image processing engine, the two or more markers to determine a match of the two or more markers within a threshold, as described above.

As further shown in FIG. 4, process 400 may include assigning an object identifier to the object depicted in the one or more images based on the match of the two or more markers (block 440). For example, the server device (e.g., using processor 320, memory 330, storage component 340, input component 350, output component 360, communication interface 370 and/or the like) may assign an object identifier to the object depicted in the one or more images based on the match of the two or more markers, as described above.

As further shown in FIG. 4, process 400 may include identifying a location of the object based on the information related to the one or more images of the object, wherein the location of the object is identified based on a location of a camera that captured the one or more images of the object in combination with an angle at which the camera was positioned relative to the object depicted in the one or more images (block 450). For example, the server device (e.g., using processor 320, memory 330, storage component 340, input component 350, output component 360, communication interface 370 and/or the like) may identify a location of the object based on the information related to the one or more images of the object, as described above. In some implementations, the location of the object is identified based on a location of a camera that captured the one or more images of the object in combination with an angle at which the camera was positioned relative to the object depicted in the one or more images.

As further shown in FIG. 4, process 400 may include associating one or more of the object or the object identifier with information identifying the location to permit the location of the object to be tracked (block 460). For example, the server device (e.g., using processor 320, memory 330, storage component 340, input component 350, output component 360, communication interface 370 and/or the like) may associate one or more of the object or the object identifier with information identifying the location to permit the location of the object to be tracked, as described above.

Process 400 may include additional implementations, such as any single implementation or any combination of implementations described below and/or in connection with one or more other processes described elsewhere herein.

In some implementations, the two or more markers comprise repeated instances of a machine-readable optical marker forming a pattern on the surface of the object. In some implementations, the information related to the one or more images includes multiple partial images of the machine-readable optical marker and the server device may stitch the multiple partial images into a single image depicting at least one complete instance of the machine-readable optical marker and determine that the one or more images relate to the object based on determining that the at least one complete instance of the machine-readable optical marker encodes the object identifier assigned to the object.

In some implementations, the two or more markers are formed from a non-visible spectrum material that is not visible to a human eye. For example, in some implementations, the non-visible spectrum material may comprise one or more of an infrared coating, an ultraviolet coating, or a light-reflective coating.

In some implementations, the server device may transmit, to a client device, information indicating that the object was observed at the identified location at a time when the camera captured the one or more images.

In some implementations, the object is a vehicle and the object identifier comprises one or more of a vehicle identification number or a license plate number associated with the vehicle. In some implementations, the object identifier is used to index information associated with a registered user of the vehicle and descriptive information about the vehicle and the server device may transmit, to a client device, one or more of the information associated with the registered user of the vehicle or the descriptive information about the vehicle based on a request from the client device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
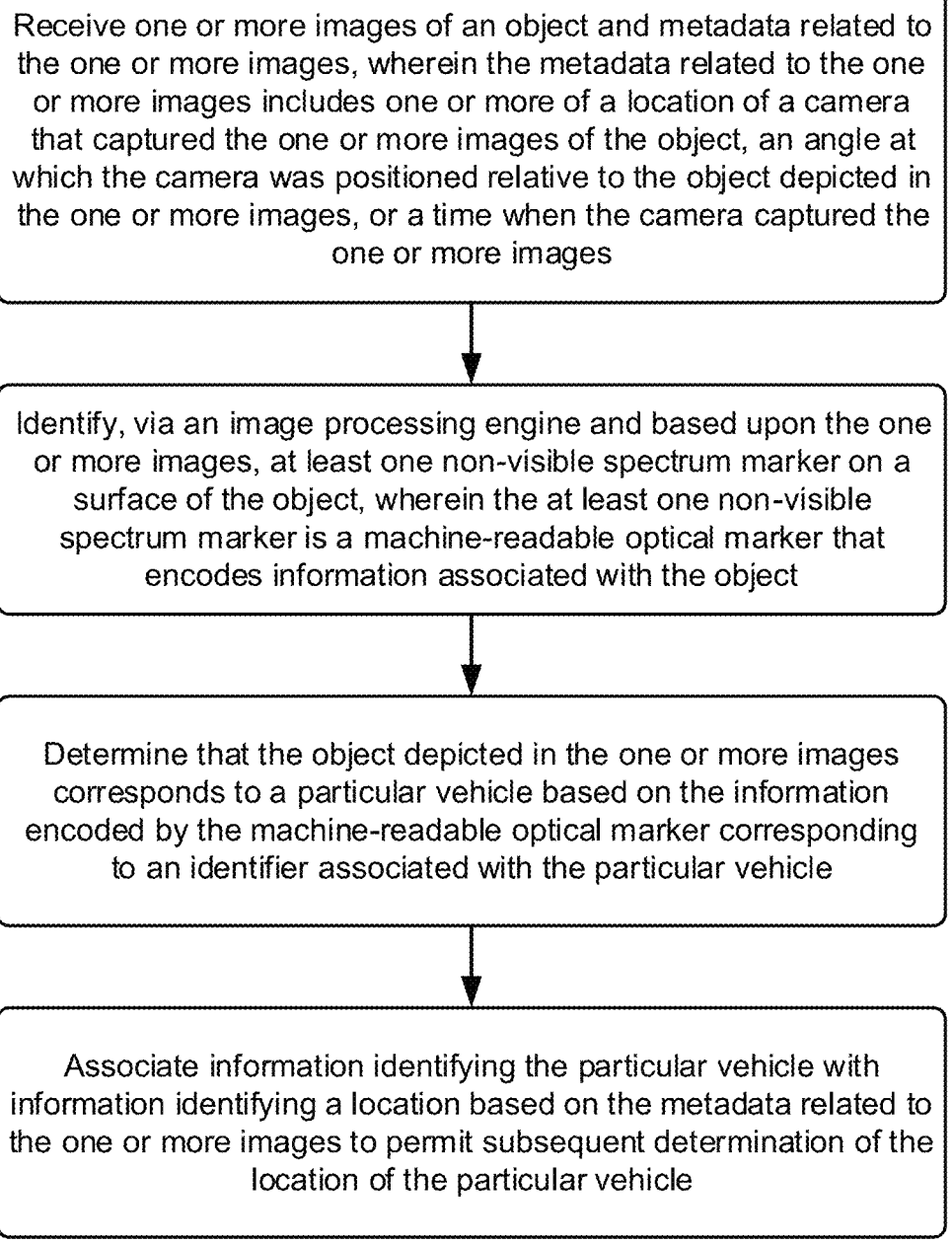

FIG. 5 is a flow chart of an example process 500 for vehicle identification based on a machine-readable optical marker. In some implementations, one or more process blocks of FIG. 5 may be performed by server device (e.g., vehicle identification platform 230). In some implementations, one or more process blocks of FIG. 5 may be performed by another device or a group of devices separate from or including the server device, such as a camera device (e.g., camera device 220), a client device (e.g., client device 250), and/or the like.

As shown in FIG. 5, process 500 may include receiving one or more images of an object and metadata related to the one or more images, wherein the metadata related to the one or more images includes one or more of a location of a camera that captured the one or more images of the object, an angle at which the camera was positioned relative to the object depicted in the one or more images, or a time when the camera captured the one or more images (block 510). For example, the server device (e.g., using processor 320, memory 330, storage component 340, input component 350, output component 360, communication interface 370 and/or the like) may receive one or more images of an object and metadata related to the one or more images, as described above. In some implementations, the metadata related to the one or more images includes one or more of a location of a camera that captured the one or more images of the object, an angle at which the camera was positioned relative to the object depicted in the one or more images, or a time when the camera captured the one or more images.

As further shown in FIG. 5, process 500 may include identifying, via an image processing engine and based upon the one or more images, at least one non-visible spectrum marker on a surface of the object, wherein the at least one non-visible spectrum marker is a machine-readable optical marker that encodes information associated with the object (block 520). For example, the server device (e.g., using processor 320, memory 330, storage component 340, input component 350, output component 360, communication interface 370 and/or the like) may identify, via an image processing engine and based upon the one or more images, at least one non-visible spectrum marker on a surface of the object, as described above. In some implementations, the at least one non-visible spectrum marker is a machine-readable optical marker that encodes information associated with the object.

As further shown in FIG. 5, process 500 may include determining that the object depicted in the one or more images corresponds to a particular vehicle based on the information encoded by the machine-readable optical marker corresponding to an identifier associated with the particular vehicle (block 530). For example, the server device (e.g., using processor 320, memory 330, storage component 340, input component 350, output component 360, communication interface 370 and/or the like) may determine that the object depicted in the one or more images corresponds to a particular vehicle based on the information encoded by the machine-readable optical marker corresponding to an identifier associated with the particular vehicle, as described above.

As further shown in FIG. 5, process 500 may include associating information identifying the particular vehicle with information identifying a location based on the metadata related to the one or more images to permit subsequent determination of the location of the particular vehicle (block 540). For example, the server device (e.g., using processor 320, memory 330, storage component 340, input component 350, output component 360, communication interface 370 and/or the like) may associate information identifying the particular vehicle with information identifying a location based on the metadata related to the one or more images to permit subsequent determination of the location of the particular vehicle, as described above.

Process 500 may include additional implementations, such as any single implementation or any combination of implementations described below and/or in connection with one or more other processes described elsewhere herein.

In some implementations, the at least one non-visible spectrum marker includes a plurality of non-visible spectrum markers formed in a pattern on multiple surfaces of the vehicle.

In some implementations, the at least one non-visible spectrum marker is subjected to a homographic transformation prior to application to the surface of the object, and the server device may identify the at least one non-visible spectrum marker by solving an inverse of the homographic transformation.

In some implementations, the one or more images include multiple partial images of the machine-readable optical marker. In some implementations, the server device may stitch the multiple partial images into a single image depicting a complete instance of the machine-readable optical marker and identify the information encoded by the machine-readable optical marker based on the complete instance of the machine-readable optical marker.

In some implementations, the information encoded by the machine-readable optical marker is used to index one or more of a vehicle identification number associated with the vehicle, a license plate number associated with the vehicle, information associated with a registered user of the vehicle, or descriptive information about the vehicle. In some implementations, the server device may transmit, to a client device, a timestamped location associated with the particular vehicle based on a request from the client device including one or more search parameters matched to the information encoded by the machine-readable optical marker.

In some implementations, the server device may process a transaction based on a timestamped location associated with the particular vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
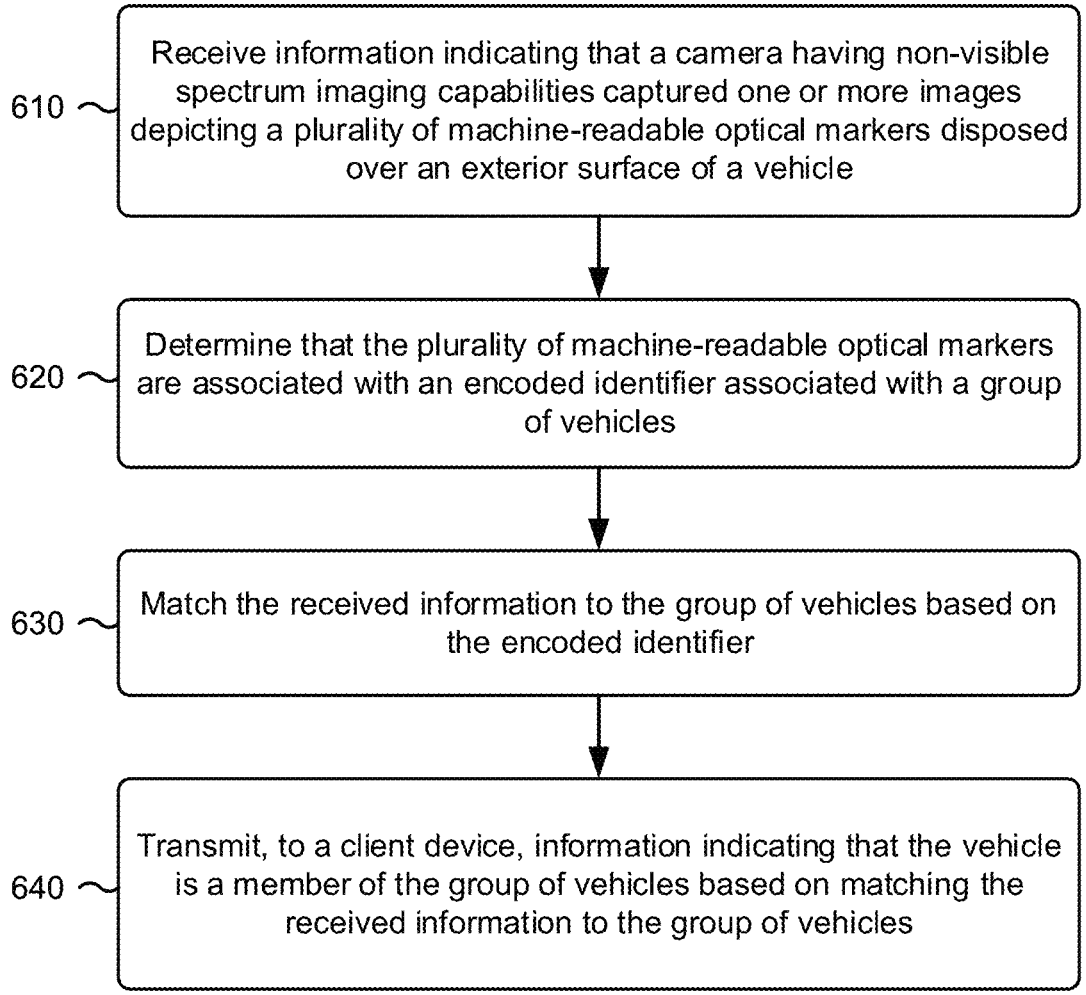

FIG. 6 is a flow chart of an example process 600 for vehicle identification based on machine-readable optical marker. In some implementations, one or more process blocks of FIG. 6 may be performed by server device (e.g., vehicle identification platform 230). In some implementations, one or more process blocks of FIG. 6 may be performed by another device or a group of devices separate from or including the server device, such as a camera device (e.g., camera device 220), a client device (e.g., client device 250), and/or the like.

As shown in FIG. 6, process 600 may include receiving information indicating that a camera having non-visible spectrum imaging capabilities captured one or more images depicting a plurality of machine-readable optical markers disposed over an exterior surface of a vehicle (block 610). For example, the server device (e.g., using processor 320, memory 330, storage component 340, input component 350, output component 360, communication interface 370 and/or the like) may receive information indicating that a camera having non-visible spectrum imaging capabilities captured one or more images depicting a plurality of machine-readable optical markers disposed over an exterior surface of a vehicle, as described above.

As further shown in FIG. 6, process 600 may include determining that the plurality of machine-readable optical markers are associated with an encoded identifier associated with a group of vehicles (block 620). For example, the server device (e.g., using processor 320, memory 330, storage component 340, input component 350, output component 360, communication interface 370 and/or the like) may determine that the plurality of machine-readable optical markers are associated with an encoded identifier associated with a group of vehicles, as described above.

As further shown in FIG. 6, process 600 may include matching the received information to the group of vehicles based on the encoded identifier (block 630). For example, the server device (e.g., using processor 320, memory 330, storage component 340, input component 350, output component 360, communication interface 370 and/or the like) may match the received information to the group of vehicles based on the encoded identifier, as described above.

As further shown in FIG. 6, process 600 may include transmitting, to a client device, information indicating that the vehicle is a member of the group of vehicles based on matching the received information to the group of vehicles (block 640). For example, the server device (e.g., using processor 320, memory 330, storage component 340, input component 350, output component 360, communication interface 370 and/or the like) may transmit, to a client device, information indicating that the vehicle is a member of the group of vehicles based on matching the received information to the group of vehicles, as described above.

Process 600 may include additional implementations, such as any single implementation or any combination of implementations described below and/or in connection with one or more other processes described elsewhere herein.

In some implementations, the plurality of machine-readable optical markers are formed from a non-visible spectrum material that comprises one or more of an infrared coating, an ultraviolet coating, or a light-reflective coating. In some implementations, the plurality of machine-readable optical markers are a plurality of two-dimensional barcodes.

In some implementations, the server device may identify a location of the vehicle based on a location of the camera that captured the one or more images in combination with an angle at which the camera was positioned when the camera captured the one or more images and transmit, to the client device, information to indicate the identified location of the vehicle. In some implementations, the server device may transmit, to the client device, information to indicate whether the vehicle is authorized to be at the identified location.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, at a server device, information related to one or more images of an object;
   identifying, using an image processing engine associated with the server device, two or more optical markers depicted in the one or more images of the object,
      wherein the two or more optical markers are disposed over a surface of the object;
   comparing, using the image processing engine associated with the server device, the two or more optical markers to stored information associated with a set of objects to determine a match of the two or more optical markers to corresponding stored information associated with a matching object;
   assigning, by the server device, an object identifier to the object depicted in the one or more images based on the match of the two or more optical markers to the corresponding stored information associated with the matching object;
   identifying, by the server device, a location of the object based on the information related to the one or more images of the object,
      wherein the location of the object is identified based on a location of a camera that captured the one or more images of the object in combination with an angle at which the camera was positioned relative to the object depicted in the one or more images;
   associating, by the server device, one or more of the object or the object identifier with information identifying the location to permit the location of the object to be tracked; and
   transmitting, by the server device and to a client device, information associated with the object identifier based on a request from the client device,
      wherein the object is a vehicle, and
      wherein the object identifier is associated with descriptive information about the vehicle.

2. The method of claim 1, wherein the two or more optical markers comprise repeated instances of a machine-readable optical marker forming a pattern on the surface of the object.

3. The method of claim 2, wherein the information related to the one or more images includes multiple partial images of the machine-readable optical marker, and
   wherein the method further comprises:
   stitching the multiple partial images into a single image depicting at least one complete instance of the machine-readable optical marker; and
   determining that the one or more images relate to the object based on determining that the at least one complete instance of the machine-readable optical marker encodes the object identifier assigned to the object.

4. The method of claim 1, wherein the two or more optical markers are formed from a non-visible spectrum material that is not visible to a human eye.

5. The method of claim 4, wherein the non-visible spectrum material comprises one or more of an infrared coating, an ultraviolet coating, or a light-reflective coating.

6. The method of claim 1, further comprising:
   transmitting, to the client device, information indicating that the object was observed at the identified location at a time when the camera captured the one or more images.

7. The method of claim 1,
   wherein the object identifier comprises one or more of a vehicle identification number or a license plate number associated with the vehicle.

8. The method of claim 7, wherein the object identifier is used to index information associated with a registered user of the vehicle and the descriptive information about the vehicle.

9. A server device, comprising:
   a memory; and
   one or more processors operatively coupled to the memory, the memory and the one or more processors configured to:
   receive one or more images of an object and metadata related to the one or more images,
      wherein the metadata related to the one or more images includes one or more of a location of a camera that captured the one or more images of the object, an angle at which the camera was positioned relative to the object depicted in the one or more images, or a time when the camera captured the one or more images;
   identify, via an image processing engine and based upon the one or more images, at least one non-visible spectrum optical marker on a surface of the object,
      wherein the at least one non-visible spectrum optical marker is a machine-readable optical marker that encodes information associated with the object;
   determine that the object depicted in the one or more images corresponds to a particular vehicle based on the information encoded by the machine-readable optical marker corresponding to an identifier associated with the particular vehicle;
   associate information identifying the particular vehicle with information identifying a location based on the metadata related to the one or more images to permit subsequent determination of the location of the particular vehicle; and
   transmit, to a client device, information associated with the identifier associated with the particular vehicle based on a request from the client device,
      wherein the identifier associated with the particular vehicle is associated with descriptive information about the particular vehicle.

10. The server device of claim 9, wherein the at least one non-visible spectrum optical marker includes a plurality of non-visible spectrum optical markers formed in a pattern on multiple surfaces of the particular vehicle.

11. The server device of claim 9, wherein:
the at least one non-visible spectrum optical marker is subjected to a homographic transformation prior to application to the surface of the object, and
the memory and the one or more processors are configured to identify the at least one non-visible spectrum optical marker by solving an inverse of the homographic transformation.

12. The server device of claim 9, wherein the one or more images include multiple partial images of the machine-readable optical marker, and
wherein the memory and the one or more processors are further configured to:
stitch the multiple partial images into a single image depicting a complete instance of the machine-readable optical marker; and
identify the information encoded by the machine-readable optical marker based on the complete instance of the machine-readable optical marker.

13. The server device of claim 9, wherein the information encoded by the machine-readable optical marker is used to index one or more of a vehicle identification number associated with the particular vehicle, a license plate number associated with the particular vehicle, information associated with a registered user of the particular vehicle, or the descriptive information about the particular vehicle.

14. The server device of claim 13, wherein the memory and the one or more processors are further configured to transmit, to the client device, a timestamped location associated with the particular vehicle based on the request from the client device including one or more search parameters matched to the information encoded by the machine-readable optical marker.

15. The server device of claim 9, wherein the memory and the one or more processors are further configured to process a transaction based on a timestamped location associated with the particular vehicle.

16. A non-transitory computer-readable medium storing one or more instructions, the one or more instructions comprising:
one or more instructions that, when executed by one or more processors of a server device, cause the one or more processors to:
receive information indicating that a camera having non-visible spectrum imaging capabilities captured one or more images depicting a plurality of machine-readable optical markers disposed over an exterior surface of a vehicle;
determine that the plurality of machine-readable optical markers are associated with an encoded identifier associated with a group of vehicles;
match the received information to corresponding stored information associated with the group of vehicles based on the encoded identifier; and
transmit, to a client device:
information indicating that the vehicle is a member of the group of vehicles based on matching the received information to the group of vehicles, and
information associated with the encoded identifier based on a request from the client device,
wherein the encoded identifier is associated with descriptive information about the vehicle.

17. The non-transitory computer-readable medium of claim 16, wherein the plurality of machine-readable optical markers are formed from a non-visible spectrum material that comprises one or more of an infrared coating, an ultraviolet coating, or a light-reflective coating.

18. The non-transitory computer-readable medium of claim 16, wherein the plurality of machine-readable optical markers are a plurality of two-dimensional barcodes.

19. The non-transitory computer-readable medium of claim 16, wherein the one or more instructions, when executed by the one or more processors, further cause the one or more processors to:
identify a location of the vehicle based on a location of the camera that captured the one or more images in combination with an angle at which the camera was positioned when the camera captured the one or more images; and
transmit, to the client device, information to indicate the identified location of the vehicle.

20. The non-transitory computer-readable medium of claim 19, wherein the one or more instructions, when executed by the one or more processors, further cause the one or more processors to transmit, to the client device, information to indicate whether the vehicle is authorized to be at the identified location.

\* \* \* \* \*